Oct. 22, 1963 J. TEAGUE, JR., ET AL 3,107,816

RECORD STORAGE AND DISPENSING DEVICE

Filed July 24, 1961 2 Sheets-Sheet 1

Inventors
James Teague, Jr.
David L. Painter
Victor A. Petertil
Dawson, Tilton, Fallon & Lungmus
Attorneys

RECORD STORAGE AND DISPENSING DEVICE

Filed July 24, 1961

Inventors
James Teague, Jr.
David L. Painter
Victor A. Petertyl
Dawson, Tilton, Fallon & Lungmus
Attorneys United States Patent Office 3,107,816
Patented Oct. 22, 1963

3,107,816

RECORD STORAGE AND DISPENSING DEVICE

James Teague, Jr., and David L. Painter, Glenview, and Victor A. Petertil, Oak Park, Ill.; said Painter assignor to James Teague and Victor Petertil Filed July 24, 1961, Ser. No. 126,198
14 Claims. (Cl. 221—88)

This invention relates to a record storage and dispensing device, and more specifically, to a unit particularly suited for storing and dispensing record albums.

As is well known, albums of so-called "long-playing" records ordinarily consist of single records contained within rectangular cardboard envelopes or jackets. Proper storage of such albums poses a problem because the records, unless supported vertically and without distorting forces imposed thereon, tend to warp. In order to reduce such warping, it is common to pack a series of vertically-oriented albums upon a bookcase shelf or some other supporting surface. With the albums stored in this manner, the titles of the record imprinted upon the faces of the albums are concealed and considerable inconvenience often arises in gripping and withdrawing any particular record album from the group with which it is packed.

Accordingly, it is an object of the present invention to provide a unit which is highly effective for storing record albums without causing warping of the records contained therein and for ejecting any selected album of the series. Another object is to provide a record album storage unit which cooperates with the record albums to hold the same in position therein even when the unit is tipped or moved about. A further object is to provide a compact unit for the storing and dispensing of record albums which is simple and inexpensive in construction and which is easily manipulated for selecting and removing any given record album of the group supported thereby.

Other objects will appear from the specification and drawings in which.

Figures 1, 2, 3, 4:
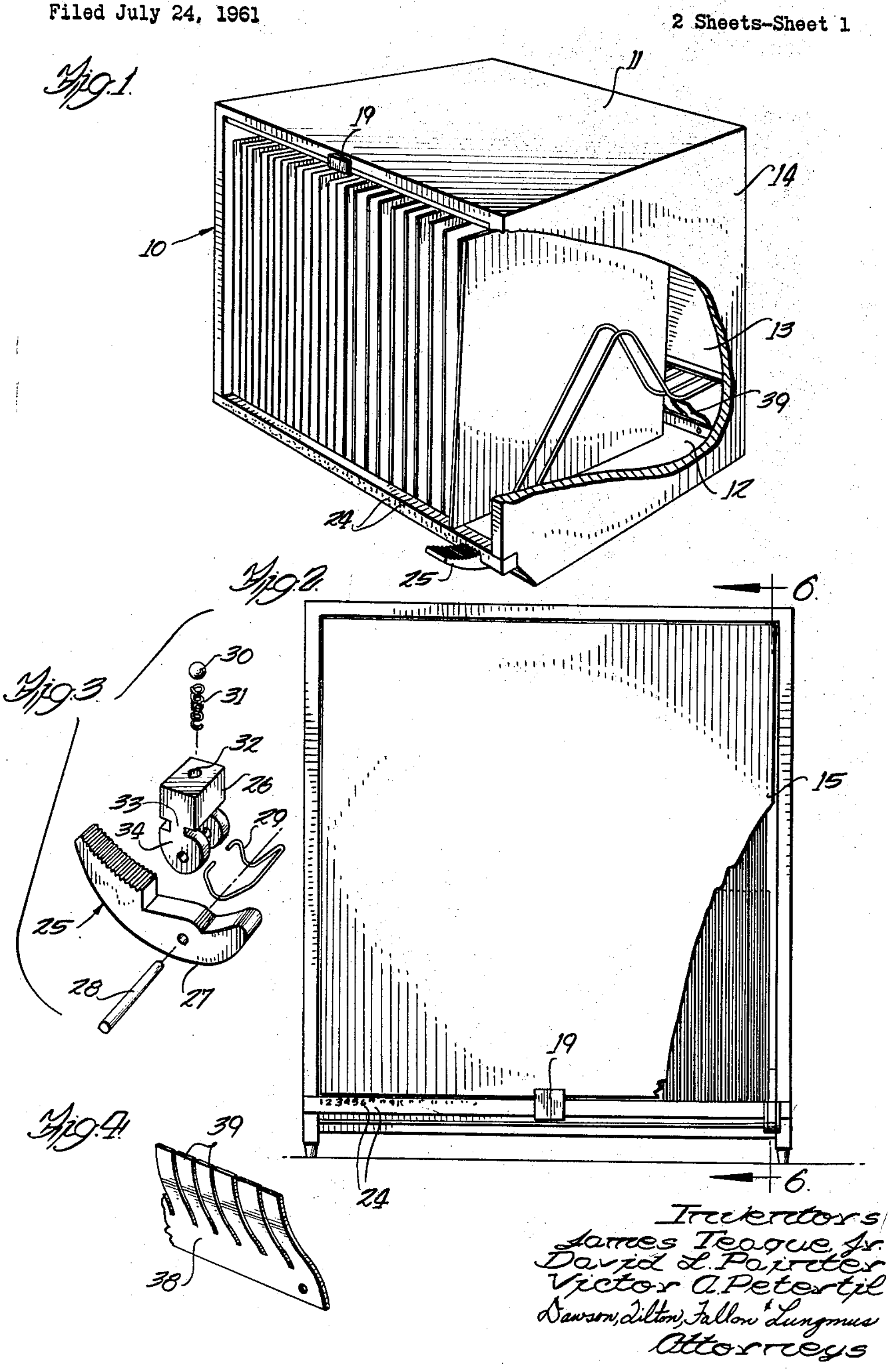
FIGURE 1 is a perspective view of an open record album storage cabinet embodying the present invention, the cabinet being nearly completely filled with record albums and being illustrated with a wall portion thereof cut away to show internal structural features thereof.
FIGURE 2 is a front elevational view of the cabinet showing the closure element thereof in closed condition, the closure having a corner portion cut away to reveal record albums supported within the interior of the cabinet.
FIGURE 3 is an exploded perspective view of the album release actuating means.
FIGURE 4 is a broken perspective view of a spring provided by the unit for ejecting (or partially ejecting) record albums.
Figure 5:
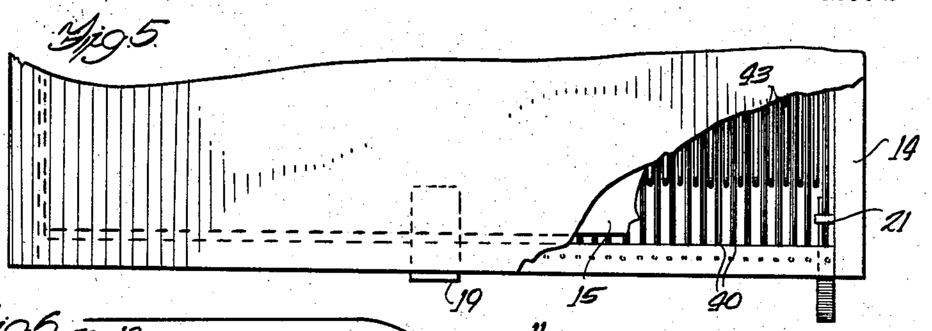
FIGURE 5 is a broken top plan view of the front portion of the cabinet.

The album storage and dispensing unit illustrated in the drawings comprises a cabinet which is generally designated by the numeral 10 and which is provided with top, bottom, rear and side walls 11–14, respectively. The cabinet is provided with a front opening adapted to be closed by closure means in the form of a slidable and pivotally mounted door 15.

Figure 6:
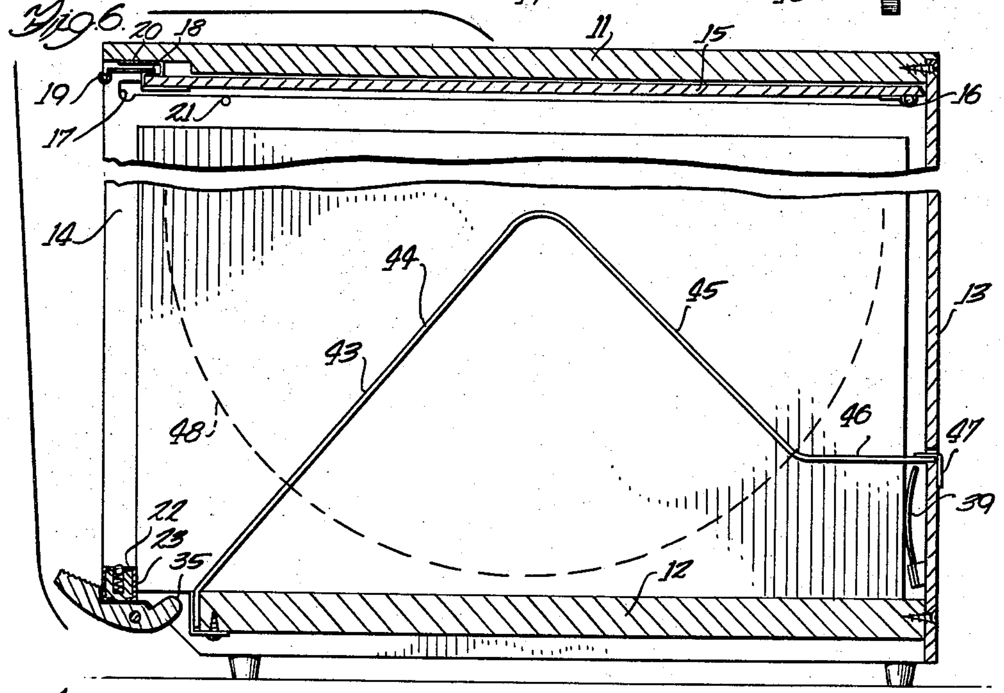
FIGURE 6 is a broken and enlarged vertical sectional view taken along line 6—6 of FIGURE 2.

As shown most clearly in FIGURE 6, door 15 is equipped along its upper edge with a transverse bar 16, the ends of which project laterally beyond the door and are slidably received within internal horizontal grooves 17 extending along the upper portions of side walls 14. When the door is in the fully retracted position shown in FIGURE 6, a rearward projection 18 of handle 19 engages and is held by a hook 20 affixed to the front portion of the cabinet's upper wall 11. If desired, additional supporting means in the form of inwardly projecting elements 21 may be provided by the front upper portions of the side walls to prevent contact between the door and the contents of the cabinet as the door is moved between its retracted position and the fully lowered position shown in FIGURE 2.

Along the front edge of the bottom wall is a channel or tube 22 of rectangular cross section, the channel being mounted so that its top and rear surfaces project upwardly above the bottom wall to form a horizontal shoulder 23. Along the bottom of the channel is a longitudinally-extending opening which is narrower than the internal width of the channel. The front surface of the channel is provided with a series of markings 24 indicating and identifying the various stop locations for the album release actuator 25.

Figure 7:
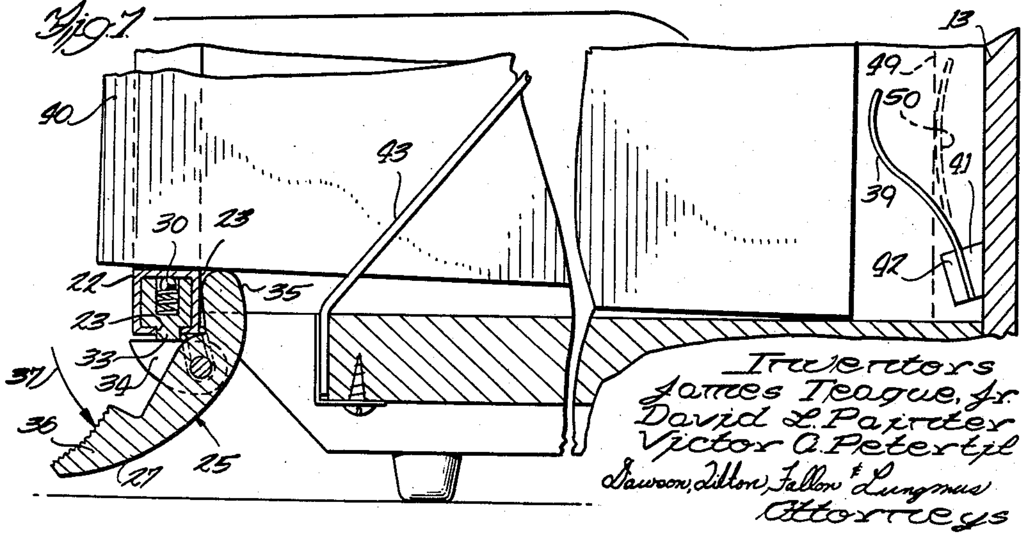
FIGURE 7 is a still further enlarged vertical sectional view similar to FIGURE 6 but showing the album release actuator in album-discharging position.

The album-release actuator is shown most clearly in FIGURES 3 and 7 and comprises a carrier element 26, a release lever 27 pivotally mounted upon the carrier by pin 28, a spring 29 for holding the lever in a non-releasing position, and a spring-loaded bearing or detent 30 to insure smooth operation of the actuator and to locate the actuator at each of the album-releasing positions.

Bearing 30 and its spring 31 are carried within a socket 32 within carrier 26, the bearing being urged by the spring into small notches in the undersurface of the tube's upper wall. The depending neck 33 of the carrier extends downwardly through the longitudinal slot or opening 23 of the tube and terminates in a pair of spaced ears 34. Pin 28 extends through the aligned apertures of the ears 34 and lever 27 and supports the lever for limited pivotal movement in a vertical plane.

Spring 29 bears against both the carrier and the lever and tends to pivot the lever in a clockwise direction when viewed as in FIGURES 6 and 7. Thus, the spring tends to pivot and normally hold the lever in a position wherein the rounded rear end portion 35 thereof is in a first or lowered position. End portion 35 is shifted into the second or raised position shown in FIGURE 7 when the forwardly projecting portion 36 of the lever is depressed in the direction indicated by arrow 37. When the exposed front end of the lever is so depressed, it will be noted that the lever's rear end portion 35 reaches an elevation at least as high as the upper surface of tube 22.

Within the cabinet, and along the lower portion of the rear wall thereof, is a leaf spring 38 having a plurality of upwardly and forwardly extending spring fingers 39 (FIGURE 4). Each of these spring fingers is capable of independent flexure and, as shown most clearly in FIGURE 7, has its free end portion spaced closer to shoulder 23 (when the spring is in an untensioned state) than the length of a standard record album 40. Mounting elements 41 and 42 securely affix the multiple-fingered leaf spring to rear wall 13. It is to be understood that while a single spring having multiple fingers is shown, a plurality of separate leaf springs, each independently secured to the rear wall by suitable mounting elements, might also be used.

Guide elements in the form of bars 43 are disposed in closely spaced parallel relation within the cabinet and perform the dual functions of maintaining record albums or folders 40 in upright condition and of directing the lower rear edges of those albums into contact with spring fingers 39 as the albums are placed within the cabinet. Each guide element has a downwardly and forwardly sloping front portion 44, a downwardly and rearwardly sloping intermediate portion 45, and a generally horizontal rear portion 46. The rear portion is spaced a sufficient distance above the bottom wall 12 of the cabinet and in close proximity to the spring to insure that each album will be guided into contact with only a single spring finger. Also, since the intermediate portion (and the rear of the front portion) is disposed above the elevation of rear portion 46, albums will not tip when they are located between the guide elements, and proper contact between the albums and the spring fingers is assured. As an album is inserted between a pair of guide elements, the elements not only guide the lower rear portion of the album into contact with a spring finger but the rear portions of the closely-spaced elements squeeze together the frequently outwardly-bowed sides of the folder or jacket so that no more than one spring finger will be engaged by the lower rear edges of a single album. This latter function is particularly important in view of the tendency of the sides of a jacket to bow or bend slightly outwardly when the jacket is clamped between shoulder 23 and spring 38. The ends of each guide element are firmly anchored to the rear wall 13, the rear portion 46 being welded or otherwise secured to angle strip 47 and the free ends of the front portions 44 being embedded in bottom wall 12.

Since shoulder 23 and the arcuate free end portions of spring fingers 39 are spaced closer together than the length of a record jacket or folder 40 when the springs are untensioned, the spring elements exert a clamping force on each album disposed within the cabinet to hold the same in the position shown in FIGURE 6. Since the spring fingers and the shoulder contact only the lower portions of the rear and front edges of each jacket, and since the spaces within a jacket immediately adjacent these points of contact are not occupied by a record, the outline of which is represented in FIGURE 6 by the numeral 48, the clamping forces are exerted upon the jacket of the album rather than the record contained therein. Thus, even though each album is firmly clamped between the shoulder and a spring finger, the clamping force will not tend to be transmitted to the record to cause warping thereof.

To eject an album, the operator simply shifts the album-release actuator 25 into a selected position along the indicia-bearing tube or channel 22 and then depresses the exposed front end of the lever 27 to lift the front portion of an album above shoulder 23. The spring finger engaging the rear edge of the selected album then flexes forwardly into the untensioned state represented by the solid line position of FIGURE 7 to push the album forwardly until its front portion projects forwardly beyond adjoining albums and may be easily grasped for removal by the operator.

To replace an album within the cabinet, an operator simply slides it rearwardly between a pair of adjacent guide elements 43 until the front lower edge of the album drops behind shoulder 23. When so positioned, the rear edge of the album will extend along the vertical broken line designated by the numeral 49 in FIGURE 7, and the tensioned spring will assume the position represented by the broken lines 50 in the same figure.

While in the foregoing, the album storage and dispensing device has been described as part of a cabinet, it will be understood that the door and the top and side walls, along with at least the upper portion of the rear wall, may be eliminated without impairing the operation of the structure in the supporting and dispensing of albums, and that in some instances it may be desirable to provide such a chassis without its protective enclosure.

While in the foregoing, an embodiment of the invention has been disclosed in considerable detail for purposes of illustration, it will be understood by those skilled in the art that many of these details may be varied widely without departing from the spirit and scope of the invention.

We claim:

1. A record storage unit having a horizontal bottom wall and an upstanding rear wall, an upstanding shoulder extending horizontally along the front of said bottom wall and in a direction parallel with said rear wall, spring means extending along said rear wall and providing a plurality of forwardly facing spring elements, the distance between said shoulder and the surfaces of said spring elements when the same are in an untensioned state being less than the jacket length of a conventional record album, whereby, when an album is disposed between said shoulder and an element of said spring means and is oriented in a vertical plane normal to said shoulder, the lower front edge of the jacket thereof is firmly held against said shoulder by said spring means and said spring means is maintained in a state of tension, and means adjacent the front of said bottom wall for lifting above said shoulder the lower front edge portion of any selected record album stored in said unit, whereby, when the front edge portion of an album is lifted above said shoulder, said spring means urges said album forwardly and the tension of said spring means is relieved.

2. The structure of claim 1 in which a horizontal series of spaced guide elements is provided by said unit, each of said elements extending along a vertical plane perpendicular to said shoulder and rear wall and being spaced from adjacent elements of the series to define album-storage spaces therebetween.

3. The structure of claim 2 in which said guide elements are provided with closely-spaced portions adjacent said spring means for guiding the lower rear portions of albums into contact with said spring means and for holding the sides of the jackets for said albums together in vertical relation.

4. In combination, a record storage unit having bottom and rear walls, an upstanding shoulder extending along the front of said bottom wall in a direction parallel with said rear wall, leaf spring means extending along said rear wall and providing a plurality of vertically disposed spring fingers, the distance between said shoulder and said fingers when the same are unflexed being less than the jacket length of a conventional record album, at least one record album extending between said shoulder and one of said spring fingers, said album extending along a vertical plane perpendicular with said shoulder and having the lower portion of the jacket thereof clamped between said shoulder and said one of said spring fingers, each of said spring fingers being under tension when a record album is disposed between the same and said shoulder, and means adjacent the front of said bottom wall for lifting the lower front edge portion of said album above said shoulder, whereby, when the lower front edge portion of an album is lifted above said shoulder, the tension of the spring finger in engagement therewith is relieved and said finger urges said album forwardly over said shoulder.

5. The structure of claim 4 in which said last-mentioned means comprises a carrier movable along said shoulder, and a release lever pivotally mounted upon said carrier and having a portion thereof engageable with the front lower edge portion of an album to lift the same free of said shoulder when said lever is actuated.

6. The structure of claim 4 in which each of said spring fingers is arcuate and has the convex surface thereof facing said shoulder.

7. The structure of claim 4 in which a series of spaced guide elements is provided by said unit, each of said guide elements extending along a vertical plane and being spaced from adjacent guide elements to define album-receiving pockets.

8. The structure of claim 7 in which said guide elements are provided with closely-spaced portions adjacent said spring means for guiding the lower rear portions of albums into contact with said spring means and for holding the sides of the jackets for said albums together in vertical relation.

9. A record storage unit comprising a cabinet having top, bottom, side and rear walls, an upstanding shoulder extending horizontally along the front edge portion of said bottom wall, leaf spring means extending horizontally within said cabinet along the rear wall thereof and in a direction parallel with said shoulder, said leaf spring means including a plurality of independently flexible spring fingers arranged side-by-side in a horizontal series, the distance between said shoulder and said spring fingers when the same are in an unflexed state being less than the jacket length of a conventional record album, whereby, when an album is disposed between said shoulder and one of said spring fingers and extends along a vertical plane perpendicular to said shoulder the lower front edge of said jacket is firmly held against said shoulder by said one spring finger and said finger is in a state of tension, and an album-release actuator movable along said shoulder and being provided with a pivotal release lever engageable with the lower front portion of any record album held in contact with said shoulder by said spring means to lift said album out of abutting contact with said shoulder, whereby, when the lower front portion of an album is lifted out of abutting contact with said shoulder the tension of the spring finger in engagement therewith is relieved and said finger urges said album forwardly over said shoulder.

10. The structure of claim 9 in which said cabinet is provided with a front opening, and closure means for closing said front opening.

11. The structure of claim 9 in which said cabinet is provided with a horizontal series of guide elements, each of said guide elements extending along a vertical plane and being spaced from adjacent elements to define album-receiving spaces therebetween.

12. The structure of claim 9 in which each of said spring fingers is arcuate and has the convex surface thereof facing said shoulder.

13. The structure of claim 11 in which each of said spring fingers is disposed in a space between the vertical guide elements of said horizontal series.

14. The structure of claim 11 in which said guide elements are provided with closely-spaced rear portions adjacent said spring fingers for guiding the lower rear portions of albums in contact with said spring fingers and for preventing the sides of said albums from bowing outwardly under the force exerted by said fingers.

References Cited in the file of this patent

UNITED STATES PATENTS

| | | |
|---|---|---|
| 1,136,256 | Noble | Apr. 20, 1915 |
| 1,258,498 | Stuebing et al. | Mar. 5, 1918 |
| 1,446,700 | Hand | Feb. 27, 1923 |
| 2,402,044 | Heckman | June 11, 1946 |
| 2,474,168 | Sacher et al. | June 21, 1949 |
| 2,998,901 | Arnold | Sept. 5, 1961 |